Figure 1:
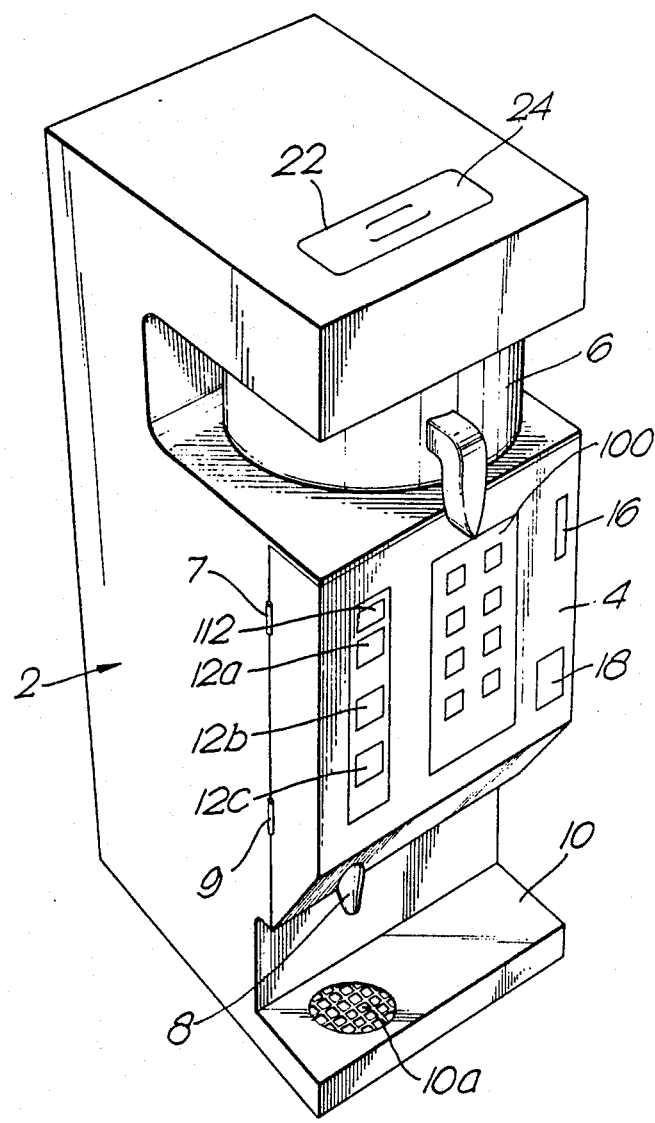

United States Patent [19]

Snowball et al.

[11] Patent Number: 4,825,758
[45] Date of Patent: May 2, 1989

[54] COFFEE AND TEA MAKING OR BREWING APPARATUS

[75] Inventors: Malcolm R. Snowball, St. Leonards-on-Sea; Cecil Hayes, Hastings, both of England

[73] Assignee: W. M. Still & Sons Limited, East Sussex, England

[21] Appl. No.: 938,456

[22] Filed: Dec. 5, 1986

[30] Foreign Application Priority Data

Mar. 27, 1985 [GB] United Kingdom ................ 8507974

[51] Int. Cl.$^4$ ............................................. A47J 31/00
[52] U.S. Cl. ........................................ 99/282; 99/283; 99/285; 99/305; 99/306
[58] Field of Search .................. 99/279, 280, 299, 282, 99/283, 285, 295, 300, 307, 304–306, 323.3, 313; 426/388, 432, 433, 434, 520; 251/7

[56] References Cited

U.S. PATENT DOCUMENTS

| | | | |
|---|---|---|---|
| 2,830,528 | 4/1958 | Arnett | 99/283 |
| 3,450,024 | 6/1969 | Martin | 99/295 |
| 4,205,598 | 6/1980 | Leuschner et al. | 99/307 |
| 4,532,142 | 7/1985 | Dean | 99/295 X |
| 4,550,651 | 11/1985 | Haynes | 99/279 |

Primary Examiner—Timothy F. Simone
Attorney, Agent, or Firm—Wood, Dalton, Phillips, Mason & Rowe

[57] ABSTRACT

A coffee and/or tea disperser having a cold water reservoir connected to a water heater which is connected in turn to a spray head. Below the head is a container for a bed of coffee grains or tea leaves and below which again is a tank for the infused beverage. Cups of freshly infused coffee or tea can be metered from the tank by a dispensing valve. In order to ensure that the amount of coffee dispensed does not vary by any significant amount as the head of liquid in the tank varies, the tank is disposed above the surface on which the cup rests by a distance, measured from the maximum head of liquid in the tank to said datum, which is at least six times the maximum displacement of liquid in the tank. Moreover the tank is wide and low. The tank is preferably dismountable for easy cleaning and level probes normally protruding into the tank are arranged to be swung out of the tank to assist dismounting. The dispensing valve is preferably formed with a flexible liquid conduit squeezed between three abutments so that the tube is not clamped but rather distorted into a closed state.

34 Claims, 4 Drawing Sheets

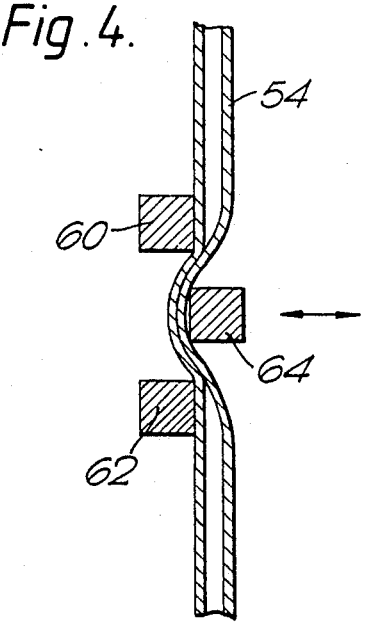
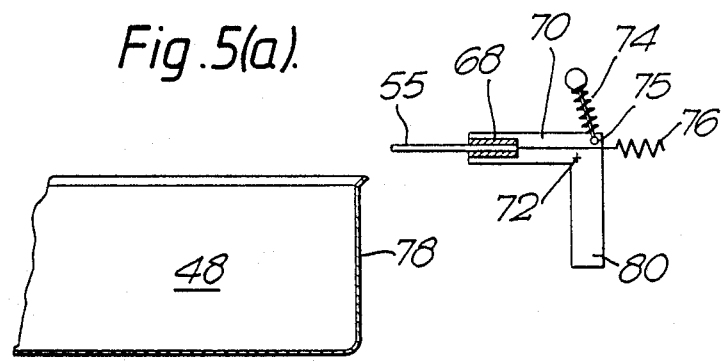
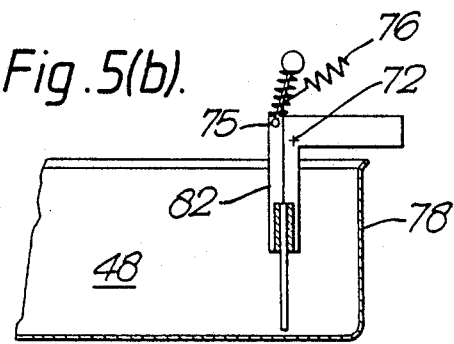

COFFEE AND TEA MAKING OR BREWING APPARATUS

This invention relates to coffee and tea making apparatus or brewing apparatus and in particular to apparatus which is capable of dispensing a predetermined volume of beverage, e.g. a cupful, for example upon payment of a fee.

Vending machines for dispensing both hot and cold beverages upon payment of a fee are well known. When dispensing hot beverages such as tea or coffee the majority of known vending machines mix a solid or liquid concentrate of the desired beverage with a quantity of hot water. Thus, these machines dispense beverages of the type commonly referred to as "instant coffee" or "instant tea" rather than beverages which are freshly prepared by infusion with tea leaves or ground coffee.

The only commercial apparatus known to the applicants capable of dispensing a beverage such as percolated coffee suffers from several disadvantages. The apparatus is plumbed in to the water mains and water is fed directly to a heating apparatus in which the water passes through a spiral passage associated with a thermostatically controlled heating element situated above an infuser basket and thereafter the hot water passes through ground coffee positioned in the infuser basket and the coffee liquor is collected in a large volume coffee tank. The coffee tank is maintained at the desired temperature by heating elements. The apparatus comprises a coin mechanism which actuates a dispensing valve on the coffee tank upon payment of a predetermined fee. The dispensing valve is positioned in the base of the coffee tank and comprises a solenoid valve having a vertically movable valve member. The coffee tank has a relatively large volume and there is a considerable pressure head differential at the dispensing valve when the levels of coffee within the tank are substantially full and substantially empty. Accordingly, the apparatus requires special control means to vary the dispensing time depending upon the level of coffee within the tank. In absence of such control mechanism there is a dispensing difference of the order of 20% when volumes are dispensed when the tank is full and the tank is substantially empty. This known apparatus has encountered problems of reliability in connection with the dispensing valve and the metering of uniform volumes of coffee.

It is an object of the present invention to provide improved coffee and tea making or brewing apparatus for dispensing metered volumes of beverage.

It is a further object of the invention to provide such apparatus wherein the amount of beverage dispensed does not significantly vary in dependence upon the level of beverage being stored in a holding tank.

Therefore according to one embodiment of the invention there is provided apparatus for making a beverage such as coffee and tea, having a casing including a cold water reservoir having an inlet and an outlet, water heating means having a water inlet and a water outlet, a first conduit communicating between said water heater means inlet and said reservoir outlet, a spray head, a second conduit communicating between said water heater means outlet and the spray head, a beverage grain bed supporting means, mounted below said spray head so as to receive a water spray therefrom, a support surface defined by said casing for supporting a dispensed-liquid container for receiving dispensed beverage therein, a beverage retaining tank mounted below said bed supporting means and above said support surface so as to receive infused beverage from said bed, said tank having a bottom outlet, a dispensing conduit means communicating with said bottom outlet of the tank, said dispensing conduit means including a dispensing valve means operable to allow predetermined volumes of said beverage to be dispensed from said tank into the beverage receiving container which has been placed upon said support surface, said beverage retaining tank being spaced above said support surface at such a distance that the maximum head of beverage in the tank relative to the support surface is at least equal to a predetermined multiple of the maximum displacement of coffee in the tank.

The apparatus of the invention is preferably coffee making apparatus and comprises an infuser basket for supporting a filter paper and ground coffee. The cold water reservoir, water heater and spray head arrangement are preferably of the type disclosed in British Pat. Nos. 2,056,266 and 2,059,753. Such an arrangement is particularly advantageous since it does not require a water pump, thermostat and sophisticated control apparatus to operate the coffee making cycle.

The beverage retaining tank preferably has a volume in excess of the water reservoir, more preferably at least three times the volume of the water reservoir.

The means for operating the dispensing valve is preferably associated with a coin mechanism such that dispensing may only occur when a predetermined value of coins have been inserted into the coin mechanism. However, the coin mechanism is not essential and the apparatus may simply be provided with a switch for dispensing a predetermined volume of beverage, e.g. a cupful.

In accordance with a further embodiment of the invention the apparatus includes one or more movable probes associated with a removable tank for containing liquid such that when the tank is removed the probe(s) is moved clear of the tank.

In accordance with a further embodiment of the invention the dispensable conduit means comprises a flexible dispensing conduit connected to and depending from said bottom outlet of the beverage retaining tank and extending to a beverage outlet and dispensing valve means comprising a pair of abutments spaced apart and positioned on one side of said dispensing conduit, a control member normally positioned intermediate said abutments adjacent to and on another side of said dispensing conduit and being movable into a portion of the space separating the said two abutments so as thereby to compress one side of the dispensing conduit against the other side of the dispensing conduit and to deflect the said conduit through an arcuate path, there being means to operate said dispensing valve means such that the dispensing conduit is either fully open or fully closed.

In another aspect of the invention there is provided a coffee and tea making machine including a casing, coffee and tea infusing means, a beverage storage tank enclosed within said casing and arranged to receive beverage formed in said coffee and tea infusing means and hot air blanket means surrounding said beverage storage tank, said blanket means including at least one heating means positioned below and spaced apart from the said tank whereby the latter is heated by convection of air from the heating means and by the air blanket means, temperature gradients in the tank being thereby substantially avoided.

Figure 2:
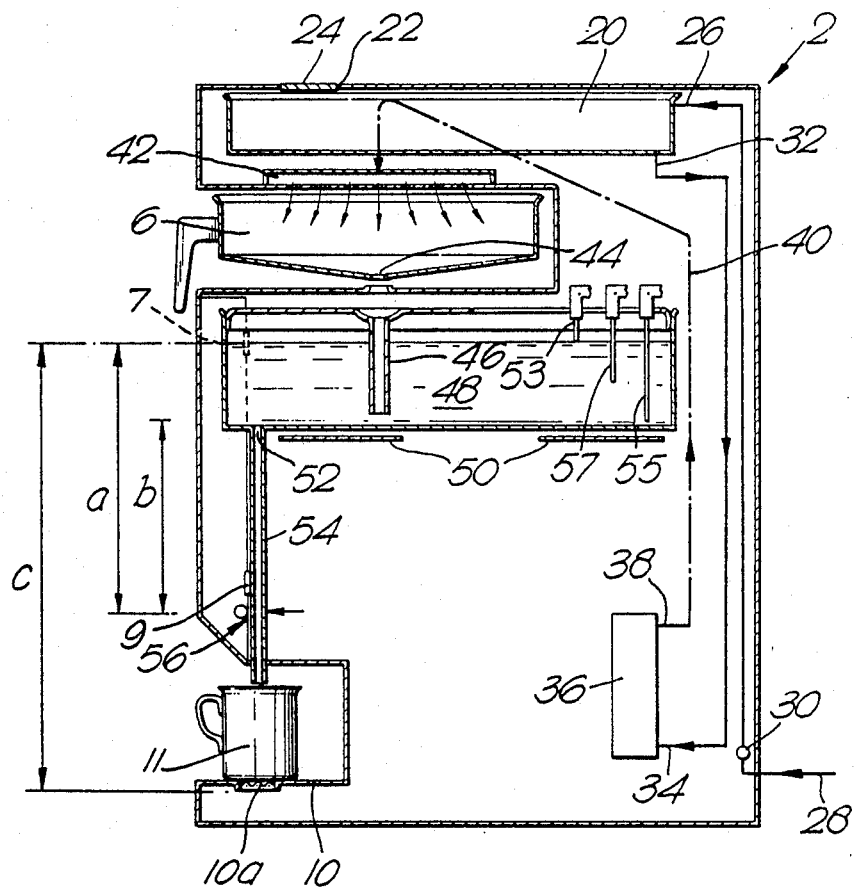
Figure 3:
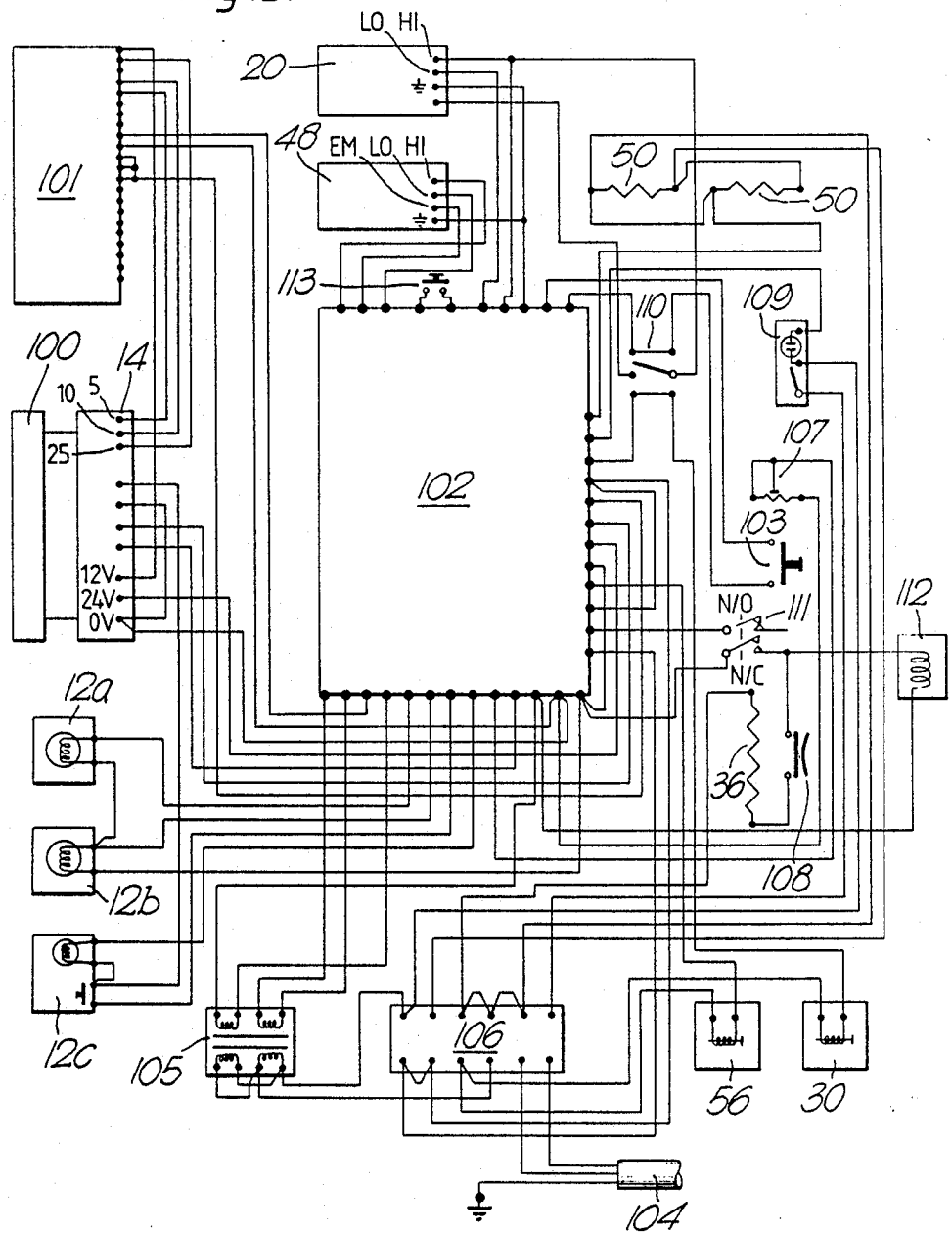

These and other objects and improvements are now described hereinafter by way of example with reference to the specific embodiments shown in the accompanying drawings, in which:

FIG. 1 is an isometric view of a coffee making apparatus in accordance with the invention, FIG. 2 is a schematic diagram showing the flow of liquid within the coffee making apparatus of FIG. 1, FIG. 3 represents a circuit diagram for controlling the coffee making apparatus in accordance with FIGS. 1 and 2, FIG. 4 represents a cross-section through a dispensing valve suitable for use in coffee making apparatus in accordance with the invention, and FIGS. 5(a) and (b) illustrate a pivoting probe suitable for use with coffee making apparatus in accordance with the invention.

Referring to FIG. 1 the coffee making apparatus comprises a casing or body 2 having a front panel 4, an infuser basket 6 and a dispensing nozzle 8. The front panel 4 of the casing is openable to allow access to the interior and for this purpose the front panel is provided with hinges 7 and 9. Beneath the dispensing nozzle 8 is a platform 10 adapted to support a container 11 (shown in FIG. 2) e.g. a cup or mug, into which the coffee is to be dispensed. The platform 10 incorporates an integral drain mesh 10a positioned beneath the nozzle which provides a support for a conventional plastics beaker and through which spilt liquids may be collected. The casing is closed during operation, except for the drain vent, and this prevents escape of heated air from the interior.

Referring to FIG. 2 the casing contains an internal cold water tank or reservoir 20 positioned at its top. The tank 20 comprises an inlet 22 through the top of the casing 2 to receive cold water from a flask or the like. The inlet 22 is provided with a cover 24 (see FIG. 1). The water tank 20 is additionally provided with a cold water inlet 26 in communication with the water mains via an inlet 28. The flow of water to the water tank via the mains is controlled by a water valve 30. Thus, the coffee making apparatus may be plumbed in to the mains or manually replenished with fresh water.

The cold water tank 20 has an outlet 32 in communication with the inlet 34 of a water heater unit 36. Heated water from the water heater unit 36 passes via the outlet 38 through a pipe 40 to a spray head 42 positioned above the coffee infuser basket 6. The basket is lined with a removable filter paper on which is positioned a bed of ground coffee (not shown). As is conventional, the infuser basket 6 can be lifted out from the apparatus using its handle in order to replace the filter paper and coffee.

The infuser basket 6 is approximately conical in shape tapering to an outlet hole 44 positioned above a vertical conduit 46 which leads to a shallow coffee tank 48 so that coffee liquor which is formed by. hot water passing from the spray head 42 through the bed of ground coffee in the infuser basket 6 passes into the coffee tank 48 for storage prior to dispensing. The coffee 48 is provided with heating pads 50 to maintain the coffee at its desired temperature. These pads are not in contact with the tank but are positioned below it so as to leave spaces therebetween. Thus the tank is heated by the heated air which is convected upwards, and by the "blanket" of surrounding air which is trapped within the casing. This arrangement avoids the formation of localised "hot" spots in the tank wall caused by uneven heating, and thereby avoids degradation of the coffee held in the tank. Heat insulation means, e.g. vacuum insulation or foam insulation, may be provided on the inside wall of the casing in the vicinity of the tank in order to assist in preserving a uniform temperature within the casing in that locality.

The coffee tank 48 has an outlet 52 in communication with a flexible dispensing tube 54 having a dispensing valve 56 to control dispensing of the coffee. The tank 48 is located, within the casing, above the drain 10a so as to have a prescribed vertical spacing therefrom. This spacing is chosen so as to reduce to an acceptable minimum the variation in the amount of coffee dispensed into a container when the tank is full as compared with when the tank is effectively empty and is such that the distance "C" between the drain and the highest level of coffee in the tank is at least or is greater than six times the maximum displacement of the coffee in the tank, i.e. the distance (a−b) where "a" and "b" are measured from the dispensing valve 56 to the levels in the tank respectively when the tank is full and empty. As is described hereinafter, these levels are defined by probes 53, 55. This arrangement of the tank 48 is such that the maximum variation in coffee dispensed will be no more than about ½ fluid ounce in respect of a 6½ fluid oz. container.

The spray head 42 and water heater unit 36 may conveniently be of the type described in our British Patent Specification Nos. 2,056,266 and 2,059,753.

FIG. 3 represents a schematic layout of the control means for the coffee making apparatus shown in FIGS. 1 and 2. The numbered components in FIG. 3 are as follows:

12a - sold-out light
12b - coffee low light
12c - coffee dispense switch and indicator
14 - totaliser board
20 - water tank
30 - water valve
36 - water heater unit
48 - coffee tank
50 - heat pads
56 - dispensing valve
100 - totaliser coin display
101 - coin mechanism
102 - control board
103 - infuse button
104 - mains cable
105 - mains transformer
106 - terminal block
107 - dispense volume adjuster
108 - excess temperature cut-out
109 - mains switch
110 - automatic/manual switch
111 - infuser safety interlock
113 - recharge switch

Coffee preparation cycle

Filter paper and ground coffee are introduced into the infuser basket 6 which is placed beneath the spray head 42 as shown in FIGS. 1 and 2. Switch 110 is selected for manual or automatic (as shown in FIG. 3) depending upon whether th water reservoir 20 is to be charged manually via the inlet 22 or from the water mains via inlet 26. The infuser button 103 is depressed for operation of the coffee making cycle when switch 110 is set in the automatic mode.

The presence of water in the water reservoir 20 is detected by a probe which switches on the water heater unit 36. Cold water flows into the water heater through the inlet 34 and water flowing through the water heater is heated by the heating element to its boiling point irrespective of its temperature at the inlet. Hot water passes from the water heater via exit 38 and rises through conduit 40 to the spray head 42. The conduit 40 is routed such that it includes a portion slightly above the water level in the reservoir 20 so that there is no pressure head from the reservoir forcing the water through the water heater and to the spray head 42. As the water is heated in the water heater unit 36 it is expanded and a small amount of steam is generated when the water reaches its boiling point. The expansion of the water and generation of steam causes hot water to rise through conduit 40 setting up an intermittent syphon delivering water into the spray head in a series of spurts. This has the advantage that the water falling on the bed of coffee is always at a consistent temperature at, or just below, boiling point which temperature is ideal for the brewing of either tea or coffee. The water heater does not deliver the hot water in a continual stream but in a series of spurts which is ideal for high coffee extraction, as the coffee grounds go through a number of flood and soak cycles.

No thermostat is required to operate the system nor is provided although a high temperature safety cut-out 108 is incorporated in the water heater to protect the heating element. The heating element in the water heater is only energised when a probe in the water reservoir 20 detects the presence of water. Thus, so long as there is water in the reservoir 20 the heater is energised and water will flow from the spray head 42. Once the tank is empty the probe will detect the absence of water and the heater in the water heater will be switched off to save energy and prevent overheating. The water reservoir also includes an additional probe for detecting when the water reservoir is full, which probe controls the water valve 30 to prevent mains water from entering the reservoir when the reservoir is full.

The water heater unit 36 may conveniently be pivoted to the inside of the casing and the associated conduits may be flexible in order to allow ready access to the interior of the coffee making apparatus, through closable ports in the casing 2 (not shown), whilst the apparatus is in use. This arrangement is particularly advantageous since certain maintenance functions may be performed whilst the machine is functioning.

The volume of the water reservoir 20 may be identical to that of the coffee tank 48 in which case the coffee tank 48 will be fully charged with a single coffee making cycle. However, there are certain advantages in utilising a system in which the coffee tank 48 has a volume in excess of that of the water reservoir 20 such that it will take two, three or more cycles to fully charge the coffee tank. In the embodiment shown in FIGS. 1 and 2 the water reservoir may conveniently have a volume of three pints and the coffee tank may have a volume of nine pints. This differential in volume capacity between the water reservoir and the coffee tank allows a smaller infuser basket 6 to be used which is recharged between cycles. Furthermore, this volume differential allows some measure of adjustment to the amount of coffee stored in the coffee tank for dispensing thereby preventing large volumes of coffee remaining in the tank for long periods of time. The volume differential also allows fresh coffee liquor to be introduced into the coffee tank before the tank is completely empty.

The second and subsequent coffee making cycles may be commenced by the procedure described above. Alternatively, the apparatus can be adjusted to automatically begin a new coffee making cycle when the level of coffee in the coffee tank is below a predetermined amount. Recharge switch 113 is provided to control the automatic cycle. Upon completion of a coffee making cycle the operator simple recharges the infuser basket with a new filter paper and ground coffee and actuates recharge switch 113. If the level of coffee in the coffee tank is already below the predetermined amount the coffee making cycle will begin immediately; if the level of coffee in the coffee tank is above a predetermined amount the coffee making cycle will commence when the level has been lowered to the predetermined amount. The coffee tank 48 includes a probe for detecting the desired level; in the embodiment illustrated in FIGS. 1 to 3 this probe is also associated with the coffee low light 12b described hereinafter.

The coffee tank 48 is also provided with means for ensuring that the tank cannot be flooded. The tank may be provided with a probe detecting the level of coffee at the top of the tank which will cause the water heater 36 to be disconnected when the tank is full thereby ensuring that no further water is heated and conveyed to the spray head. Additionally, an infuser safety interlock 111 and an infuser interlock indicator 112 is incorporated so that if the infuser basket is accidentally removed during the brewing cycle the water heater 36 will be disconnected ceasing the water cycle and preventing flooding of the machine.

Dispensing cycle

The coffee making apparatus illustrated in FIGS. 1 to 3 may be adjusted to dispense metered volumes of coffee liquor via the dispensing nozzle 8 either upon insertion of a predetermined amount of money via coin slot 16 an operation of the coffee dispense switch 12c or simply operation of the latter switch. In the payment mode the machine may be adjusted to operate only upon receiving a predetermined value of money in the form of coins. The coin mechanism 101 may comprise any known mechanism for identifying coins and has an associated reject mechanism for rejecting any abnormal coins, conveying such coins to the reject aperture 18. The coin mechanism is in electrical communication with the totaliser display board 14 which comprises a series of lights each associated with a particular monetary value. Thus, when it is necessary to insert a number of coins to reach the predetermined price of the coffee the lights on the totaliser display board will correspond to the total amount of money inserted as each coin is entered. When the correct amount of money has been inserted the coffee dispense switch 12c lights up indicating to the user that it may be operated for the machine to dispense coffee via nozzle 8. When the switch 12c lights up the coin mechanism is automatically inhibited thereby ensuring that any further money inserted into the coin slot is returned via the reject mechanism.

Upon operation of the coffee dispense switch 12c the dispensing valve 56 is opened for a sufficient time to dispense a predetermined amount of liquid. In the embodiment shown in FIGS. 1 to 3 the dispensing valve 56 is operated by a solenoid which retracts the valve to an open position for a predetermined time period, which time period may be adjusted by dispense volume adjuster 107. By suitably positioning the coffee tank 48 as described previously there is no necessity to provide special provisions for altering the time period for dispensing when the coffee tank is substantially full or substantially empty.

Though the dispensing valve 56 may comprise any known valve arrangement, the machine of FIG. 2 uses the pinch valve shown in FIG. 4. Pinch valves are preferred because coffee is an oily liquid which tends to leave deposits and gum-up ordinary valves. Whilst conventional pinch valves which simply compress the tube in a vice-like grip may be utilised, it has been found that such valves may cause damage to the tubing often resulting in severing the flexible tubing. This is believed to be due to the fact that coffee liquor often contains a small amount of solid particles which may be trapped between the jaws of the valve during the clamping operation causing damage to the internal walls of the tubing.

The valve of FIG. 4 comprises two spaced-apart, fixed members 60, 62 and a movable member 64 operated by a solenoid The flexible dispensing tube 54 passes between the fixed and movable members, the spacing between members 60 and 64 and 64 and 62 being such that when the movable member is in the closed position of the valve the flexible tube is deformed into the space between members 60 and 62 so as to completely close the bore in one or more places in a similar manner to kinking a hose pipe. Thus, the walls of the flexible tube 54 are not clamped between solid jaws of a vice-like valve which could cause damage to the tubing.

During the operation of the apparatus the valve 56 is maintained fully open when dispensing the beverage and is fully closed at other times. As a consequence there is never a restricted passage through dispensing tube 54 which might cause a build-up of dummy deposits.

The coffee making apparatus depicted in FIGS. 1 to 3 additionally comprises visual display means in the form of a "sold out" light 12a indicating that no coffee remains in the coffee tank 48 and a "coffee low" light 12b indicating that the level of coffee in the tank 48 is low. The coffee tank 48 is provided with three probes arranged at different levels within the tank. One probe 53 is present to detect when the tank is full, which probe is utilised to prevent a further coffee making cycle from taking place. A second probe 57 is positioned at some intermediate level, e.g. at the level when the tank is approximately one third full, which probe causes the "coffee low" light to display and allows initiation of a new coffee making cycle either automatically or by pressing the infuser button 103. A third probe is present in the coffee tank 48 to detect when the tank is completely empty which probe 55 ensures that the coin mechanism will not accept further money and the coffee dispensing switch will be inoperable.

The front panel 4 of the coffee making apparatus is hinged at one edge in order that it may be opened to remove the coffee tank 48 for cleansing. In order to facilitate cleansing of the coffee tank 48 and to prevent damage to the probes therein, the probes 53, 55, 57 are preferably arranged such that they are automatically moved clear of the coffee tank when the tank is removed from the coffee making apparatus for cleansing.

FIG. 5 of the accompanying drawings illustrates in cross-section an arrangement of pivoting probes in relation to the coffee tank 48. FIG. 5a illustrates the coffee tank 48 in the withdrawn position with a probe 55 moved clear of the coffee tank 48. The probe 55 is mounted in an insulating block 68 held in a pivoting member 70 having a substantially L-shaped cross-section. The pivoting member 70 is pivoted about an axis 72 and is maintained in the position shown in FIG. 5a with the probe 55 raised by a compression spring 74 acting on the point 75. Electrical connectors are provided to the probe at 76.

When the coffee tank 48 is inserted into position within the coffee making apparatus, the end of the tank 78 abuts the arm 80 of the pivoting member 70 causing the member to pivot to the position shown in FIG. 5b. During this pivoting action the point of action 75 on the pivoting member 70 of the compression spring 74 moves from one side of the axis 72 to the other thereby ensuring that the pivoting member 70 is held in the position shown in FIG. 5b with the probe directed into the coffee tank 48. Removal of the coffee tank causes end 78 to abut the arm 82 of the pivoting member 70 moving the pivoting member to the probe-raised position shown in FIG. 5a.

We claim:

1. Apparatus for making a beverage such as coffee and tea and dispensing a predetermined quantity thereof, said apparatus having a casing and comprising:
    a cold water reservoir having an inlet and an outlet and a predetermined capacity;
    a spray head;
    hot water means for supplying hot water to said spray head, said means for supplying hot water drawing the contents of the cold water reservoir and comprising:
        a continuous-flow instantaneous-acting water heater having a water inlet and a water outlet, a first conduit communicating directly between said water heater inlet and said reservoir outlet, a second conduit communicating directly between said water heater outlet and said spray head, energizing means for energizing said water heater in response to water flowing therein, and means for disabling said energizing means when there is no water in the reservoir;
    a beverage grain bed supporting means, mounted below said spray head so as to receive a water spray therefrom;
    a support surface defined by said casing for supporting a dispensed-liquid container for receiving dispensed beverage therein;
    a beverage retaining tank mounted below said bed supporting means and above said support surface so as to receive infused beverage from said bed, said tank having a bottom outlet,
    said tank having an operating displacement capacity at least equal to the capacity of the said cold water reservoir; and
    a dispensing conduit means communicating with said bottom outlet of the tank, said dispensing conduit means including a dispensing valve means operable for a predetermined period to allow a discrete portion of said beverage to be dispensed from said tank into a beverage receiving container which has been placed upon said support surface,
    said beverage retaining tank being spaced above said support surface at such a distance that the maximum head of beverage in the tank relative to the support surface is at least equal to a predetermined multiple of the maximum displacement of beverage in the tank, whereby the quantity of beverage dispensed through said dispensing valve is between predetermined maximum and minimum limits.

2. Apparatus as claimed in claim 1 wherein said predetermined multiple is at least six.

3. Apparatus as claimed in claim 1 wherein said beverage retaining tank has a first liquid containing volume and said reservoir has a second liquid containing volume, said first volume being greater than said second volume.

4. Apparatus as claimed in claim 3 wherein said first volume is at least three times said second volume.

5. Apparatus as claimed in claim 1 wherein said dispensing valve is controlled by a coin operated mechanism.

6. Apparatus as claimed in claim 1 wherein said dispensing valve means is controlled by a switch means.

7. Apparatus as claimed in claim 1 wherein said tank extends laterally through said apparatus a lateral extent substantially greater than the depth of said tank.

8. Apparatus as claimed in claim 1 further comprising at least one liquid level detecting probe mounted adjacent said beverage retaining tank so as to detect a predetermined level of beverage in said tank.

9. Apparatus as claimed in claim 8 wherein said beverage retaining tank is removably mounted in the casing.

10. Apparatus as claimed in claim 9 wherein said at least one probe is pivotally mounted so as to be movable from a substantially vertical operable position to at least a substantially horizontal position where said at least one probe is disengaged from said tank.

11. Apparatus as claimed in claim 10 having a first liquid level probe to determine when the tank is full and at least a second liquid level probe, said second probe determining when the tank is empty, each said probe being pivotally mounted so as to be movable to a position where it is disengaged from the tank.

12. Apparatus according to claim 1 wherein said dispensing conduit means comprises a fleible dispensing conduit connected to and depending from said bottom outlet of the beverage retaining tank and extending to a beverage outlet and dispensing valve means comprising a pair of abutments spaced apart and positioned on one side of said dispensing conduit, a control member normally positioned intermediate said abutments adjacent to and on another side of said dispensing conduit and being movable into a portion of the space separating the said two abutments so as thereby to compress one side of the dispensing condit against the other side of the dispensing conduit and to deflect the said conduit through an arcuate path, there being means to operate said dispensing valve means such that the dispensing conduit is either fully open or fully closed.

13. Apparatus according to claim 12 wherein said abutments are spaced apart in the vertical direction and said conduit is vertically disposed between said abutments and said control member.

14. Apparatus for making a beverage such as a coffee or tea and dispensing a predetermined quantity thereof, said apparatus comprising:
a casing having recess means in the lower part thereof for receiving a container into which coffee is dispensed, a cold water reservoir having an inlet and an outlet, and a predetermined capacity;
a spray head;
hot water means for supplying hot water to said spray head,
said means for supplying hot water drawing the contents of the cold water reservoir and comprising:
a continuous flow instantaneous-acting water heater having a water inlet and a water outlet, a first conduit communicating directly between said water heater inlet and said reservoir outlet, a second conduit communicating directly between said water heater outlet and said spray head, energizing means for energizing said water heater in response to water flowing therein, and means for disabling said energizing means when there is no water in the reservoir;
a beverage grain bed supporting means, mounted below said spray head so as to receive a water spray therefrom;
a support surface within said recess and being defined by said casing for supporting the container for receiving dispensed beverage therein;
a beverage retaining tank mounted in said casing below said bed supporting means and above said support surface so as to receive infused beverage from said bed, said tank having a bottom outlet,
a dispensing conduit means communicating with said bottom outlet of the tank,
said dispensing conduit means including a dispensing valve means operable for a predetermined period to allow a discrete portion of said beverage to be dispensed from said tank into a beverage receiving container which has been placed upon said support surface,
said beverage retaining tank being spaced above said support surface at such a distance that the maximum head of beverage in the tank relative to the support surface is at least equal to a predetermined multiple of the maximum displacement of beverage in the tank,
whereby the quantity of beverage dispensed through said dispensing valve is between predetermined maximum and minimum limits.

15. Apparatus according to claim 14 wherein said casing substantially encloses said beverage retaining tank to form an air blanket surrounding said tank, said apparatus further comprising heater means in said casing mounted below said beverage retaining tank and spaced therefrom whereby heat is transmitted to the tank from the heater means by convection currents and from hot air to said blanket which has been heated by said heating means whereby temperature gradients in said tank are minimised.

16. Apparatus as claimed in claim 14 wherein said predetermined multiple is at least six.

17. Apparatus as claimed in claim 14 wherein said beverage retaining tank has a first liquid containing volume and said reservoir has a second liquid containing volume, said first volume being greater than said second volume.

18. Apparatus as claimed in claim 17 wherein said first volume is at least three times said second volume.

19. Apparatus as claimed in claim 14 wherein said dispensing valve is controlled by a coin operated mechanism.

20. Apparatus as claimed in claim 14 wherein said dispensing valve means is controlled by a switch means.

21. Apparatus as claimed in claim 14 wherein said tank extends laterally through said apparatus a lateral extent substantially greater than the depth of said tank.

22. Apparatus as claimed in claim 14 further comprising at least one liquid level detecting probe mounted adjacent said beverage retaining tank so as to detect a predetermined level of beverage in said tank.

23. Apparatus as claimed in claim 22 wherein means removably mount beverage retaining tank in the casing.

24. Apparatus as claimed in claim 23 wherein means mount said at least one probe for pivoting movement from a substantially vertical operable position to at least a substantially horizontal position where said at least one probe is disengaged from said tank.

25. Apparatus as claimed in claim 24 having a first liquid level probe to determine when the tank is full and at least a second liquid level probe, said second probe determining when the tank is empty, there being means to mount each said probe pivotally so as to be movable to a position where it is disengaged from the tank.

26. Apparatus according to claim 14 wherein said dispensing conduit means comprises a flexible dispensing conduit connected to a depending from said bottom outlet of the beverage retaining tank and extending to a beverage outlet and dispensing valve means comprising a pair of abutments spaced apart and positioned on one side of said dispensing conduit, a control member normally positioned intermediate said abutments adjacent to and on another side of said dispensing conduit and being movable into a portion of the space separating the said two abutments so as thereby to compress one side of the dispensing conduit against the other side of the dispensing conduit and to deflect the said conduit through and arcuate path, there being means to operate said dispensing valve means such that the dispensing conduit is either fully open or fully closed.

27. Apparatus according to claim 26 wherein said abutments are spaced apart in the vertical direction and said conduit is vertically disposed between said abutments and said control member.

28. In a coffee and tea making machine comprising coffee and tea infusing means and a beverage storage tank contained within an enclosed housing for storing the beverage after it has been brewed, the improvement comprising air convection means including at least one air heating element positioned externally of and spaced apart from the beverage tank so as to prevent direct conduction of heat from said at least one heater to the heating tank and air blanket means surrounding the tank for creating a uniform temperature environment therefor and said beverage tank having a least a portion that is a single-walled construction to readily conduct heat from the heating element to beverage in said beverage storage tank.

29. The improved coffee and tea making machine according to claim 28 wherein said air blanket substantially entirely surrounds said beverage storage tank.

30. The improved coffee and tea making machine according to claim 28 including a second means for heating a liquid from said coffee and tea infusing means prior to delivery of said liquid to said beverage storage tank and means are provided for operating said one heating means independently of said second heating means.

31. Apparatus for making a beverage such as coffee and tea and dispensing a predetermined quantity thereof, said apparatus having a casing and comprising:
a cold water reservoir having an inlet and an outlet and a predetermined capacity;
a spray head;
hot water means for supplying hot water to said spray head, said means for supplying hot water drawing the contents of the cold water reservoir and comprising:
a continuous-flow instantaneous-acting water heater having a water inlet and a water outlet, a first conduit communicating directly between said water heater inlet an said reservoir outlet, a second conduit communicating directly between said water heater outlet and said spray head, energizing means for energizing said water heater in response to water flowing therein, and means for disabling said energizing means when there is no water in the reservoir;
a beverage grain bed supporting means, mounted below said spray head so as to receive a water spray therefrom;
a support surface defined by said casing for supporting a dispensed-liquid container for receiving dispensed beverage therein;
a beverage retaining tank mounted below said bed supporting means and above said support surface so as to receive infused beverage from said bed, said tank having a bottom outlet,
said tank having a operating displacement capacity at least equal to the capacity of the said cold water reservoir;
said casing having a housing surrounding said beverage retaining tank and bounding an air space around said beverage retaining tank;
a heating element;
means mounting the heater element in said air space spaced from the beverage retaining tank so as not to conduct heat directly through the beverage retaining tank,
said heating element causing air in the air space to be heated so that the heated air defines a blanket that surrounds the beverage retaining tank to create a uniform temperature environment therefor; and
a dispensing conduit means communicating with said bottom outlet of the tank, said dispensing conduit means including a dispensing valve means operable for a predetermined period to allow a discrete portion of said beverage to be dispensed from said tank into a beverage receiving container which has been placed upon said support surface,
said beverage retaining tank being spaced above said support surface at such a distance that the maximum head of beverage in the tank relative to the support surface is at least equal to a predetermined multiple of the maximum displacement of beverage in the tank,
whereby the quantity of beverage dispensed through said dispensing valve is between predetermined maximum and minimum limits.

32. Apparatus for making a beverage such as a coffee or tea and dispensing a predetermined quantity thereof, said apparatus comprising:
a casing having recess means in the lower part thereof for receiving a container into which coffee is dispensed, a cold water reservoir having an inlet and an outlet, and a predetermined capacity;
a spray head;
hot water means for supplying hot water to said spray head,
said means for supplying hot water drawing the contents of the cold water reservoir and comprising:
a continuous flow instantaneous-acting water heater having a water inlet and a water outlet, a first conduit communicating directly between said water heater inlet and said reservoir outlet, a second conduit communicating directly between said water heater outlet and said spray head, energizing means for energizing said water heater in response to water flowing therein, and means for disabling said energizing means when there is no water in the reservoir;

a beverage grain bed supporting means, mounted below said spray head so as to receive a water spray therefrom;

a support surface within said recess and being defined by said casing for supporting the container for receiving dispensed beverage therein;

a beverage retaining tank mounted in said casing below said bed supporting means and above said support surface so as to receive infused beverage from said bed, said tank having a bottom outlet, said casing having a housing surrounding said beverage retaining tank and bounding an air space around said beverage retaining tank;

a heating tank;

means mounting the heater element in said air space spaced from the beverage retaining tank so as not to conduct heat directly through the beverage retaining tank, said heating element causing air in the air space to be heated so that the heated air defines a blanket that surrounds the beverage retaining tank to create a uniform temperature environment therefor; and a dispensing conduit means communicating with said bottom outlet of the tank, said dispensing conduit means including a dispensing valve means operable for a predetermined period to allow a discrete portion of said beverage to be dispensed from said tank into a beverage receiving container which has been placed upon said support surface, said beverage retaining tank being space above said support surface at such a distance that the maximum head of beverage in the tank relative to the support surface is at least equal to a predetermined multiple of the maximum displacement of beverage in the tank, whereby the quantity of beverage dispensed through said dispensing valve is between predetermined maximum and minimum limits.

33. An improved coffee and tea making machine of the type comprising a casing, coffee and tea infusing means and a beverage storage tank enclosed within said casing and arranged to receive a beverage formed in said coffee and tea infusing means, the improvement comprising: hot air blanket means for maintaining a hot air blanket surrounding said beverage storage tank, said hot air blanket means including at least one heating means positioned within the said air blanket below and spaced apart from the said tank, the beverage in said tank is heated by the convection of air from the heating means throughout said blanket, whereby temperature gradients in the tank are thereby substantially avoided, wherein said air blanket means substantially entirely surrounds said beverage storage tank.

34. An improved coffee and tea making machine of the type comprising a casing, coffee and tea infusing means and a beverage storage tank enclosed within said casing and arranged to receive a beverage formed in said coffee and tea infusing means, the improvement comprising: hot air blanket means for maintaining a hot air blanket surrounding said beverage storage tank, said hot air blanket means including at least one heating means positioned within the said air blanket below and spaced apart from the said tank, the beverage in said tank is heated by the convection of air from the heating means throughout said blanket, whereby temperature gradients in the tank are thereby substantially avoided, said coffee and tea making machine further including a second means for heating a liquid from said coffee and tea infusing means prior to delivery of said liquid to said beverage storage tank and means are provided for operating said one heating means independently of said second heating means.

* * * * *